United States Patent [19]

McGregor

[11] Patent Number: 5,327,947
[45] Date of Patent: Jul. 12, 1994

[54] VERTICAL AUGER TYPE BAG FILLER HAVING A VIBRATING BOWL WITH INVERTED VENTING CONE AND ROTATING AGITATOR ASSEMBLY

[76] Inventor: Harold R. McGregor, 216 South Grove, Owatonna, Minn. 55060

[21] Appl. No.: 573,554

[22] Filed: Aug. 27, 1990

Related U.S. Application Data

[63] Continuation-in-part of Ser. No. 270,845, Nov. 14, 1988, Pat. No. 4,944,334, and a continuation-in-part of Ser. No. 559,629, Jul. 30, 1990, Pat. No. 5,042,539.

[51] Int. Cl.⁵ .................... B65B 1/08; B65B 1/12; B65B 1/20
[52] U.S. Cl. ........................ 141/71; 141/59; 141/73; 141/74; 141/76; 141/77; 141/79; 141/80; 100/145; 366/309; 366/111; 366/341; 222/77; 222/239
[58] Field of Search ........... 141/59, 71, 72, 73, 141/74, 75, 76, 77, 78, 79, 80, 83, 93, 114, 128, 256, 257, 276, 10, 12; 366/111, 114, 341, 281, 282, 283, 288, 287, 305.7, 307, 309, 331; 100/145; 222/71, 77, 161, 196, 198, 55, 199, 200, 239–242

[56] References Cited

U.S. PATENT DOCUMENTS

| | | | |
|---|---|---|---|
| 2,778,387 | 1/1957 | Diehl | 222/241 |
| 3,191,642 | 6/1965 | Saito | 222/241 X |
| 3,305,133 | 2/1967 | Parker | 222/241 X |
| 3,369,578 | 2/1968 | Lambert | 141/256 X |
| 3,664,385 | 5/1972 | Carter | 141/12 |
| 3,828,984 | 8/1974 | Gmuer | 222/196 |
| 4,164,244 | 8/1979 | Meier | 141/256 X |
| 4,185,669 | 1/1980 | Jevakohoff | 141/59 |
| 4,633,932 | 1/1987 | Hinzmann | 141/256 X |
| 4,676,690 | 6/1987 | Allen | 222/196 X |
| 4,805,673 | 2/1989 | Wohrle et al. | 141/10 |
| 4,944,334 | 7/1990 | McGregor | 141/71 |

FOREIGN PATENT DOCUMENTS

| | | | |
|---|---|---|---|
| 733453 | 2/1943 | Fed. Rep. of Germany | 141/77 |
| 715413 | 2/1980 | U.S.S.R. | 222/241 |
| 912613 | 3/1982 | U.S.S.R. | 222/241 |
| 1402487 | 6/1988 | U.S.S.R. | 141/72 |

Primary Examiner—Ernest G. Cusick
Attorney, Agent, or Firm—Moore & Hansen

[57] ABSTRACT

A vertical auger bottom-fill bag filling machine including a conical auger bowl depending from a cylindrical hopper on rocker arms, with the auger bowl being connected to the cylindrical hopper and a fill tube by flexible gaskets. A vertical auger shaft extends through the cylindrical hopper, auger bowl, and fill tube, with a section of flighting disposed within the auger bowl and fill tube to compress, de-aerate, and dispense the product. An agitator is mounted on the bottom of an agitator drive shaft which circumscribes the auger shaft and rotates independent thereof, the agitator having paddles which move the product and press the product downwardly in the auger bowl. An inverted venting cone is disposed within the auger bowl, with a vent tube extending upwardly and terminating proximate to the top of the cylindrical hopper. The inverted venting cone and vent tube are connected to the auger bowl to vibrate therewith, the vent tube surrounding and being spaced apart from the auger shaft and agitator drive shaft. The fill tube includes an enlarged upper section which permits the auger bowl to vibrate even though the diameters of the section of flighting and lower section of the fill tube are closely fitted. The vertical auger bottom-fill bag filling machine is incorporated into an automated bag filling system including a bag magazine, bag pickup and hanging mechanism, bag elevator assembly, bag weighing mechanism, bag conveyor, sealing station, and associated controls.

36 Claims, 7 Drawing Sheets

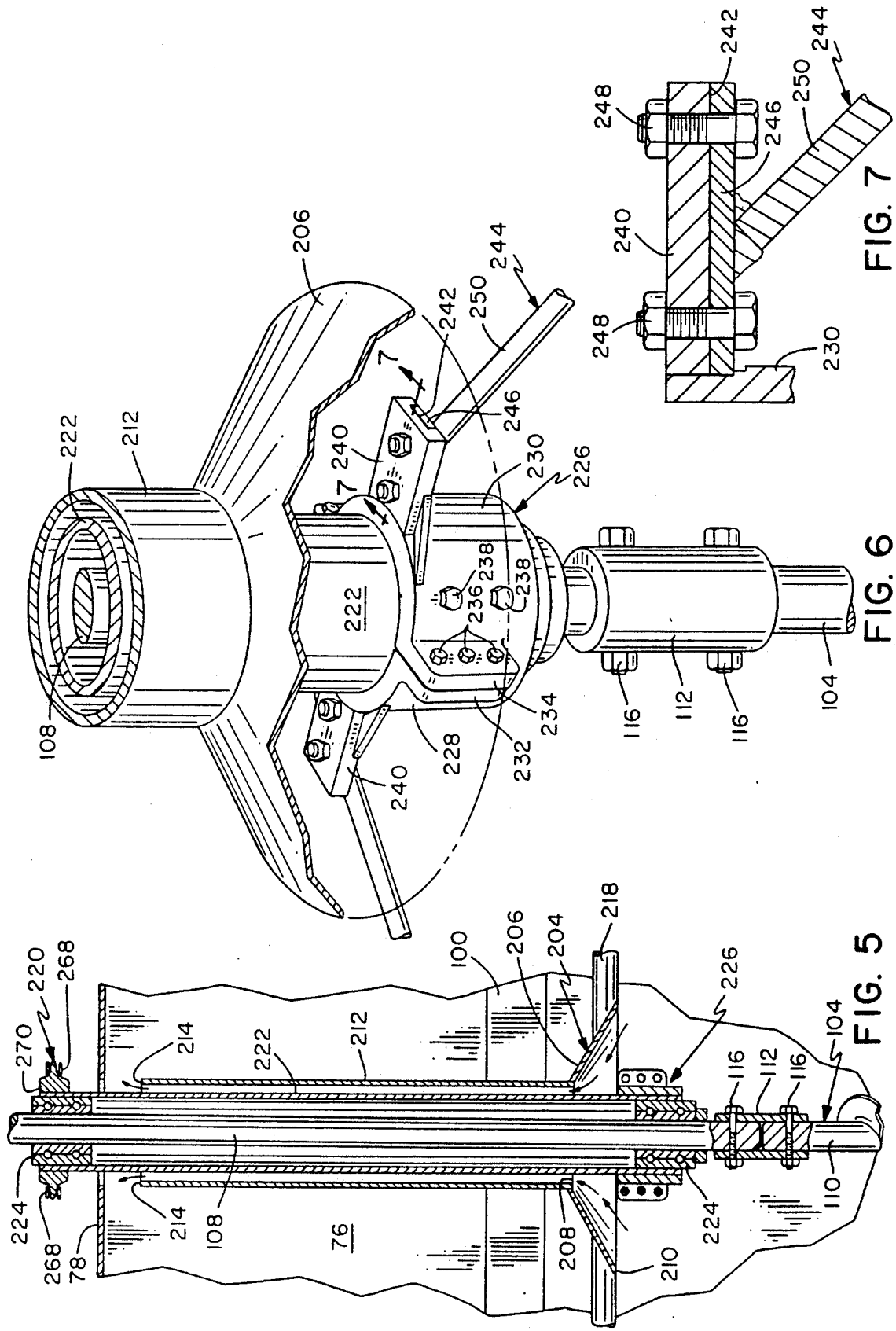

VERTICAL AUGER TYPE BAG FILLER HAVING A VIBRATING BOWL WITH INVERTED VENTING CONE AND ROTATING AGITATOR ASSEMBLY

This application is a continuation-in-part of U.S. patent application Ser. No. 07/270,845, filed on Nov. 14, 1988 issued on Jul. 31, 1990 as U.S. Pat. No. 4,944,334 entitled Vibrating Hopper and Auger Feed Assembly, as well as the co-pending U.S. patent application Ser. No. 07/559,629 filed on Jul. 30, 1990 now U.S. Pat. No. 5,042,539 entitled Vertical Bottom-Fill Auger Assembly similarly a continuation-in-part of the above U.S. patent application Ser. No. 07/270,845.

BACKGROUND OF THE INVENTION

This invention relates generally to vertical auger or vertical screw type bag filling machines for filling products into bags, and particularly to a vertical auger type bag filler having a vibrating bowl, inverted venting cone, and a rotating agitator assembly.

The above referenced patent discloses a vibrating hopper with inverted cone connected to a vertical auger bag filling machine via a cross auger conveyor. This system has proven effective for de-aerating and filling many types of powdered and granular products that were previously, at best, difficult to de-aerate and fill. In particular, the system provides great adaptability to handling different types of products through adjustments and fine tuning of the various elements along the system, and provides for adjustment of those components.

Other efforts to combine the de-aerating effects of a vibrating hopper with the advantages of an automated vertical bottom-fill auger and bag handling system have been attempted. In particular, the Model 3CM-F Automatic Bagging Machine by the Newlong Machine Works, Ltd. of Tokyo, Japan (American-NewLong Inc., Indianapolis, Ind.) incorporates a vibrating hopper and a two vertical screw feeds which may be adapted between a standard configuration and a specialized configuration for extremely fine powdered products.

For extremely fine powdered products, the Newlong system utilizes a service hopper which feeds product into a vibratile hopper. The vibratile hopper is disposed above a conical primary fill hopper having a fill tube and screw feeder with a bag elevator mechanism which permits bottom filling of bags. The bags are lowered by the bag elevator mechanism when the filling process commences, with the filling cycle being controlled by a timer that interrupts rotation of the screw feeder after a pre-set time. The bag top is shaped and the bag is then forwarded to a secondary fill station which is also disposed beneath the vibratile hopper. The bag is supported from above on a load-cell weight scale, and a secondary screw feeder fills the bag with the balance of a pre-set weight of product. The bag is then transferred via a conveyor to a bag inserter and bag top slitter, and the top of the bag is then sealed using a heat sealer or stitching machine.

However, there are several disadvantages to such a system. Four hoppers or bowls are required to accomplish both the vibrational de-aeration process and the independent primary filling and secondary topping processes, with at least three of those hoppers or bowls being disposed in generally vertical alignment. Including the height of the fill tubes and conduits connecting the hoppers or bowls, the system then requires significant minimum interior ceiling height for clearance. The system requires two outlet ports from the vibratile hopper, thus preventing effective use of auxiliary equipment within the vibratile hopper such as an inverted venting cone, vertical auger, or an agitator assembly. Since the bag is transferred between a primary fill station and a topping station with correctional weighing commencing after the bag reaches the topping station, there is a significant delay in processing bags through the system. The system requires two independent sets of screw feeder drives for the separate filling stations, and if the system is adapted for automated responsive filling, two sets of controls for measuring product density within the two fill tubes and adjusting the revolutions of the two screw feeders are necessary. The system for filling extremely fine powders is distinct from the standard arrangement, and tuning either system for different types of products can only be accomplished by synchronizing several system elements.

BRIEF SUMMARY OF THE INVENTION

It is therefore one object of this invention to design an automated bag filling system which utilizes a single stage vertical bottom-fill auger configuration which provides vibrational de-aeration directly within the auger bowl.

It is another object of this invention to design the above system such that the auger bowl may be equipped with an venting device such as an inverted venting cone.

It is an additional object of this invention to design the above system such that the auger bowl may be equipped with an agitator that moves and depresses the product during vibration of the auger bowl, the rotation of the agitator being independent in both speed and direction from that of the vertical auger shaft.

It is yet another object of this invention to design the above system such that it may be fabricated on a scale for filling medium or heavy weight bags on the order of tens or hundreds of kilograms, and alternately on a smaller scale that allows filling of bags where the total product weight may be on the order of only a few ounces or kilograms.

It is a related object of this invention to design the above system such that tuning may be accomplished with a minimum of synchronization of elements, and such that individual elements may be tuned for desired effects.

It is an additional object of this invention to design the above system such that it may be used to densify and fill products which were previously incapable of being de-aerated or filled by machine and therefore required hand filling, such as certain types of blown insulation products, silica sands and flours, and the like.

Briefly described, the vertical auger bottom-fill bag filling machine of this invention includes a conical auger bowl depending from a cylindrical hopper on rocker arms, with the auger bowl being connected to the cylindrical hopper and a fill tube by flexible gaskets. A vertical auger shaft extends through the cylindrical hopper, auger bowl, and fill tube, with a section of flighting disposed within the auger bowl and fill tube to compress, de-aerate, and dispense the product. An agitator is mounted on the bottom of an agitator drive shaft which circumscribes the auger shaft and rotates independent thereof, the agitator having paddles which moves the product and press the product downwardly in the auger-bowl. An inverted venting cone is disposed within the auger bowl, with a vent tube extending upwardly and terminating proximate to the top of the cylindrical hopper. The inverted venting cone and vent tube are connected to the auger bowl to vibrate therewith, the vent tube surrounding and being spaced apart from the auger shaft and agitator drive shaft. The fill tube includes an enlarged upper section which permits the auger bowl to vibrate even though the diameters of the section of flighting and lower section of the fill tube are closely fitted. The vertical auger bottom-fill bag filling machine is incorporated into an automated bag filling system including a bag magazine, bag pickup and hanging mechanism, bag elevator assembly, bag weighing mechanism, bag conveyor, sealing station, and associated controls.

BRIEF DESCRIPTION OF THE DRAWINGS

FIG. 5 is a partial cross section view of the auger shaft, agitator drive shaft, vent tube and inverted venting cone taken through line 5—5 in FIG. 2;

FIG. 6 is a perspective view showing the auger shaft connection and agitator mounting collar;

FIG. 7 is a cross section view of one embodiment of the paddle mounting assembly taken through line 7—7 of FIG. 6;

DESCRIPTION OF THE PREFERRED EMBODIMENT

The vertical auger bottom-fill bag filling machine of this invention is shown in FIGS. 1-11 and referenced generally therein by the numeral 10.

Figure 1:
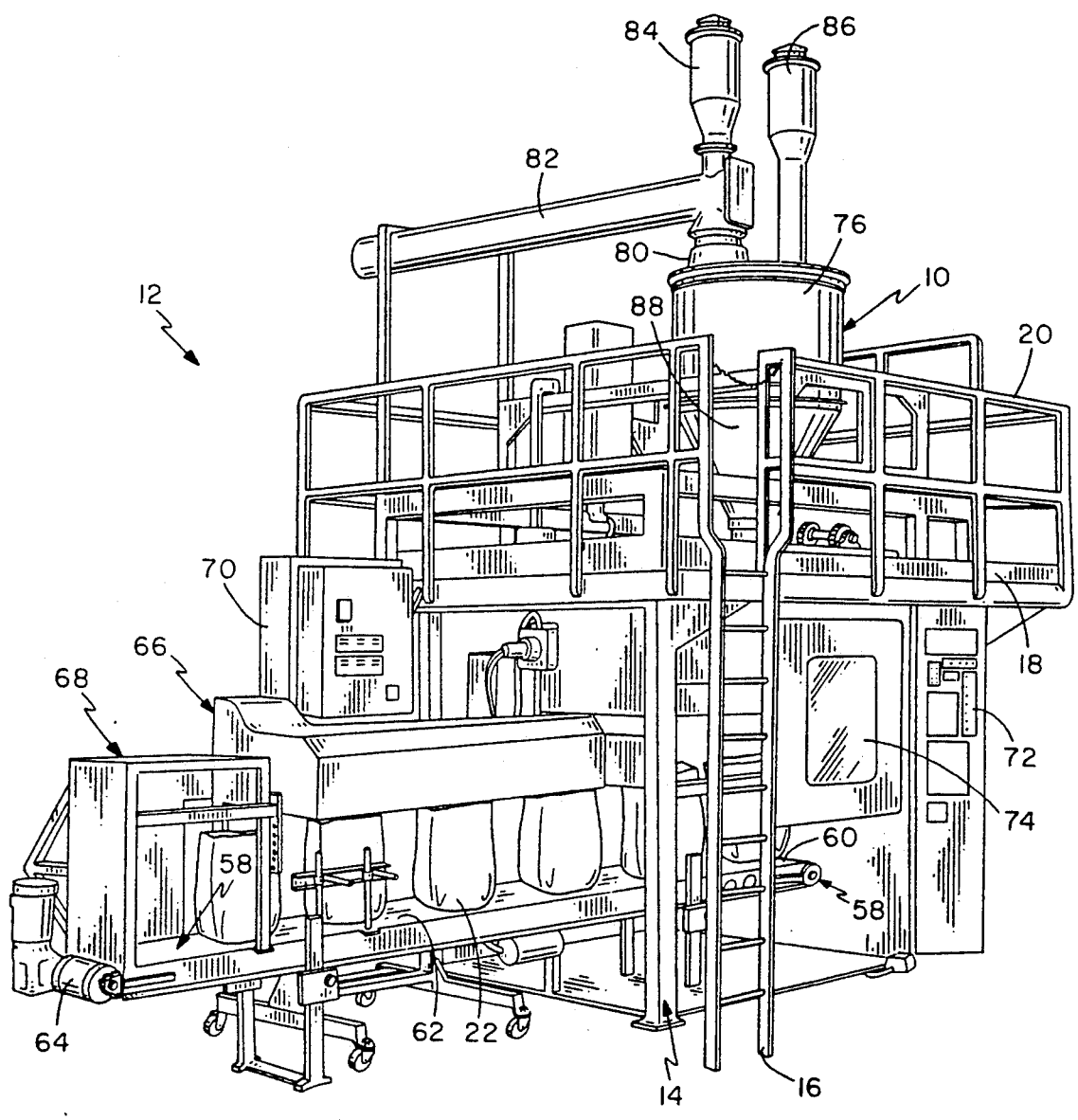
FIG. 1 is a perspective view of the automated bag filling system of which the vertical auger bottom-fill bag filling machine of this invention is a component.
Figure 2:
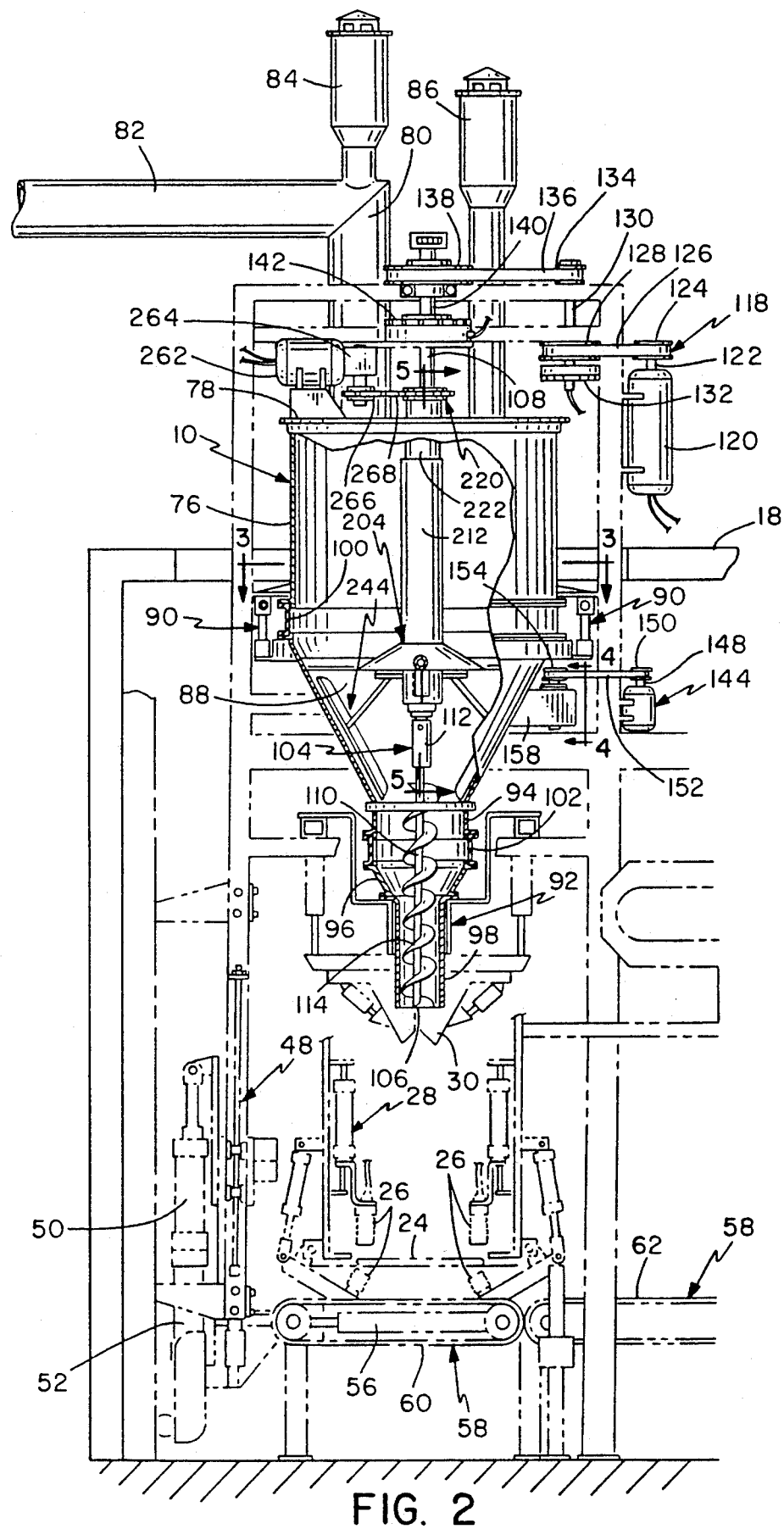
FIG. 2 is a side elevation view of the vertical auger bottom-fill bag filling machine of this invention.

Referring particularly to FIGS. 1 and 2, it may be seen that the vertical auger bottom-fill bag filling machine 10 is incorporated into an automated bag filling system 12. The vertical auger bottom-fill bag filling machine 10 is mounted within a frame assembly 14 including an access ladder 16 and an upper deck 18 and a railing 20 surrounding the vertical auger bottom-fill bag filling machine 10.

Figure 8:
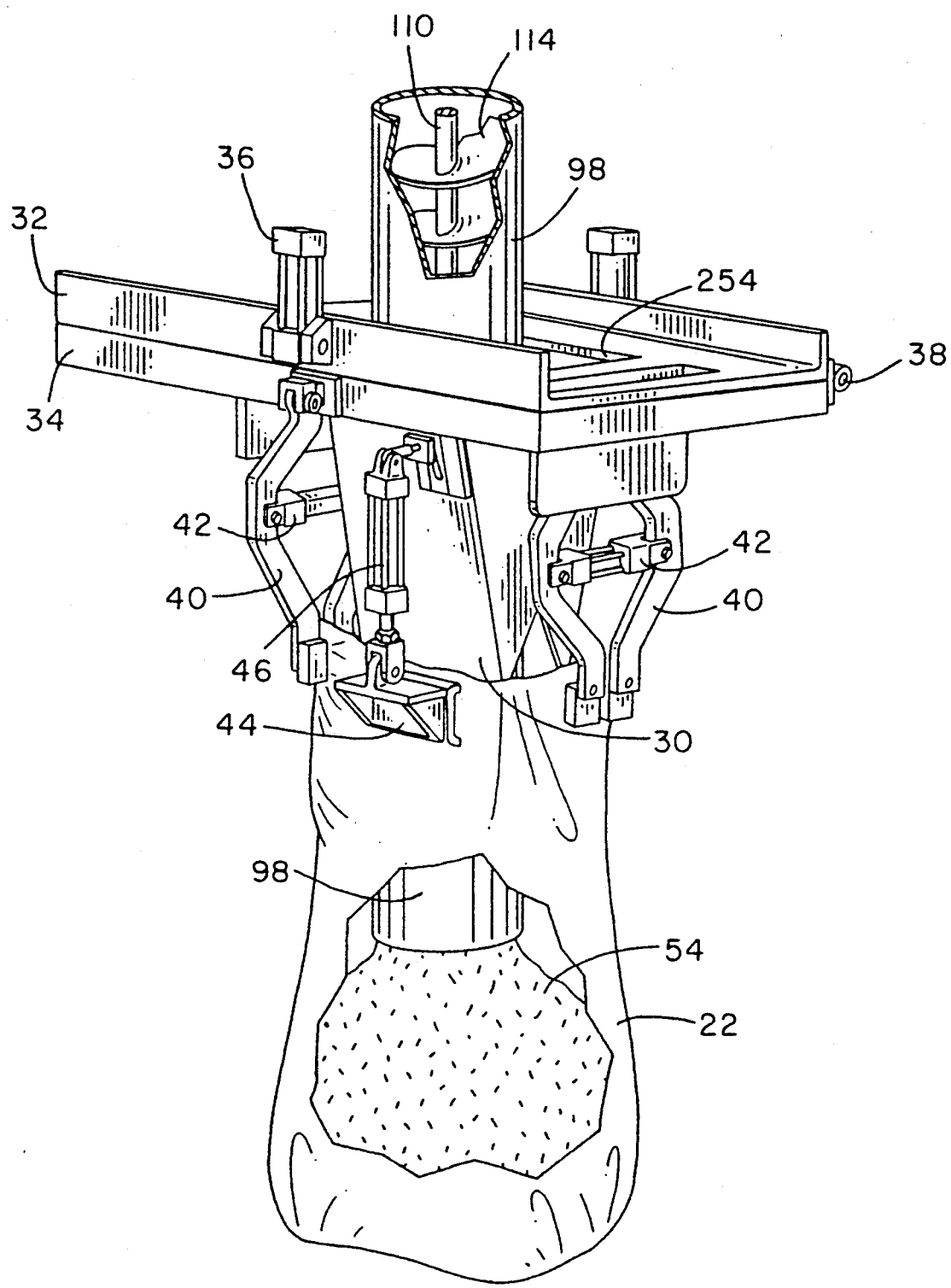
FIG. 8 is a diagrammatic perspective view of the pivoting spout and bag hanging mechanism utilized with the vertical auger bottom-fill bag filling machine of FIG. 2.

An empty bag 22 is transferred by a bag input conveyor 24 from a conventional bag magazine (not shown) to a position proximate to the vertical auger bottom-fill bag filling machine 10, and is grasped by the bag gripping members 26 of the bag pickup and hanging mechanism 28 which pivot upwardly and mount the bag 22 on a clam-jaw fill spout 30 as shown in FIG. 8. The fill spout 30 is mounted on a pair of generally horizontal carrier plates 32, 34, the lower plate 34 being pivoted downward by a dual acting power cylinder 36 across a hinge 38 extending along the edges of the carrier plates 32, 34 opposite the power cylinder 36. The fill spout 30 is pivoted toward the bag conveyor 24 and bag pickup and hanging mechanism 28 to permit the bag 22 to be mounted on the fill spout 30. The bag 22 is held in place on the fill spout 30 by two pair of bag holding members 40 which grip and hold the top gusset of the bag 22 on opposing sides of the fill spout 30, and are pivoted by dual acting power cylinders 42. The central portion of the top of each bag 22 is held against the fill spout 30 by a pair of clamping assemblies 44 which are each similarly pivoted by a dual acting power cylinder 46 mounted on or adjacent to the fill spout 30.

The bag pickup and hanging mechanism 28, fill spout 30, horizontal carrier plates 32, 34, bag holding members 40, and clamping assemblies 44 are carried in the vertical direction by a bag elevator assembly 48 of a conventional type, which may also include a pair of dual acting power cylinders 50, 52 which permit continuous settling of the product 54 filled into the bag 22 using an oscillating bag settling arm 56 which travels with the bag 22 as the bag 22 is raised and lowered along a generally vertical path during the bag hanging and filling cycle.

Filled bags 22 are lowered by the bag elevator assembly 48 onto a conveyor belt assembly 58 including a dual track conveyor 60 disposed beneath the fill spout 30 and an extended conveyor belt 62 driven by a motor assembly 64. The conveyor belt 62 transports the bag 22 to or through a bag folding machine 66 and sealing station 68 which fold the open tops of the bags 22 and seal the bags 22 using conventional techniques such as stitching, adhesive, or a heat seal.

The operation of the vertical auger bottom-fill bag filling machine 10, bag elevator assembly 48, bag pickup and hanging mechanism 28, conveyor belt assembly 58, bag folding machine 66 and bag sealing station 68 are coordinated by a central processing unit (CPU) 70 which receives signals from various sensors and load cells disposed on those components, and which may be manually operated, interrupted, reset, or monitored via a control panel 72. A safety shield 74 permits visual inspection of the operation of the vertical auger bottom-fill bag filling machine 10, bag elevator assembly 48, and bag pickup and hanging mechanism 28 throughout the bag hanging and filling cycle during operation of the vertical auger bottom-fill bag filling machine 10.

Referring again to FIGS. 1 and 2, the vertical auger bottom-fill bag filling machine 10 may be seen to comprise a generally cylindrical hopper 76 which is fixedly attached and mounted to the frame assembly 14 at or slightly above the height of the deck 18. The hopper 76 includes a generally circular lid 78 which covers and seals the open top of hopper 76. Product 54 is dispensed into the hopper 76 through an inlet tube 80 connected to and communicating with an aperture or inlet port in the lid 76, the inlet tube 80 being connected to a cross auger 82 or other mechanism for conveying product 54 to the hopper 76 from a replenishable source or supply (not shown). As the product 54 is de-aerated in the cross-auger 82, air pressure is vented through an air outlet or venting port 84 in the top of the cross auger 82. Similarly, as the product 54 is de-aerated in the vertical auger bottom-fill bag filling machine 10, air pressure is vented through an air outlet or venting port 86 connected to and communicating with an aperture or outlet in the lid 78 of the hopper 76.

A conical auger bowl 88 is suspended beneath the hopper 76 on a plurality of pivotal connecting rod assemblies 90. A fill tube assembly 92 is connected to the bottom of the auger bowl 88 and is composed of an outlet or neck region 94 of the auger bowl 88, an upper fill tube segment 96 or reducer fitting, and a lower fill tube segment 98 which are aligned and communicate with one another.

Figure 10:
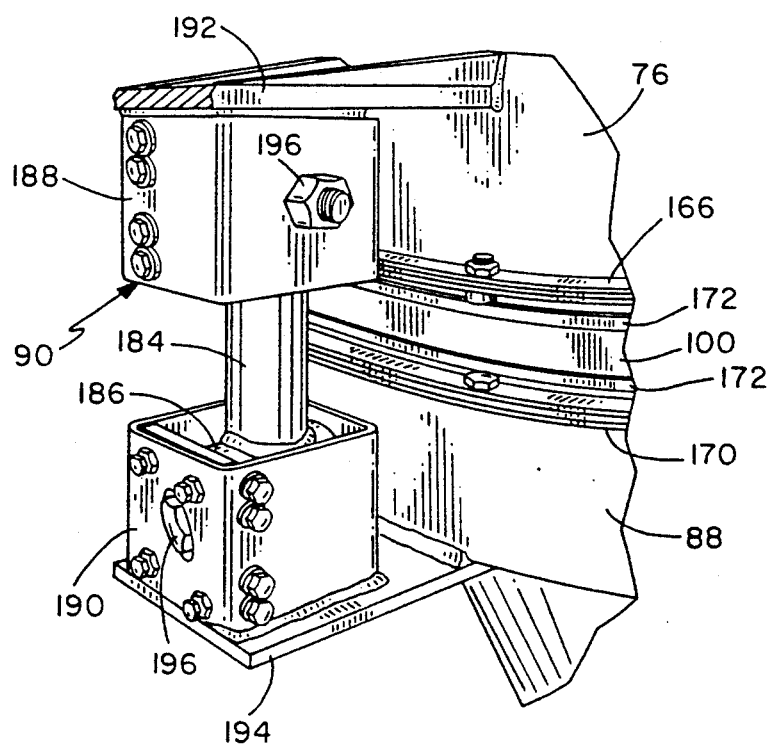
FIG. 10 is a perspective view of the rocker arm connection between the cylindrical hopper and auger bowl, including the flexible gasket disposed therebetween.

Referring to FIGS. 2 and 10, it may be seen that the hopper 76 is spaced apart above and connected to the top of the auger bowl 88 by a flexible gasket or resilient connector 100. The upper fill tube segment 96 is spaced apart beneath and connected to the bottom of the neck region 94 of the auger bowl 88 by a similar but smaller diameter flexible gasket or resilient connector 102.

Referring to FIGS. 2 and 5, it may be seen that a multi-stage auger shaft 104 extends downwardly through the hopper 76 and auger bowl 88 from a point disposed above the lid 78 to the distal end 106 of the lower fill tube segment 98. The auger shaft 104 is composed of an upper shaft segment 108 and a lower shaft segment 110 connected by a coupler 112, the lower shaft segment 110 including a section of flighting 114 or helical screw blades which compress product 54 within the fill tube assembly 92 and dispense product 54 from the distal end 106 into the bag 22. The upper shaft segment 108 and lower shaft segment 110 are interlocked together by the coupler 112 and connected thereto using a plurality of threaded fasteners 116 or similar conventional securing devices.

The top end of the auger shaft 104 extends upwardly through the lid 78 of the hopper 76 and is connected to a shaft drive assembly 118. The drive assembly 118 includes a high torque, variable speed DC drive motor 120 having an upwardly extending motor shaft 122 and geared drive wheel 124 connected thereto. A geared drive belt 126 meshes with the drive wheel 122 and is mounted thereon, and extends horizontally to a second geared drive wheel 128 mounted at the lower end of an intermediate drive axle 130. A pneumatic clutch 132 is connected to the bottom of the intermediate drive axle 130, and to a source of gas pressure which is controlled by the CPU 70. The pneumatic clutch 132 may be used to selectively or responsively control the rate and direction of rotation of the intermediate drive axle 130, or to completely disengage the intermediate drive axle 130. A third drive wheel 134 is connected to the top end of the intermediate drive axle 130. A second geared drive belt 136 meshes with and is mounted on the third geared drive wheel 134 and extends horizontally to a fourth geared drive wheel 138 connected to the top of a second intermediate drive axle 140. A second pneumatic clutch 142 is disposed between and connected to the lower end of the second intermediate drive axle 140 and the top end of the upper auger shaft 108, and may be used to selectively or responsively control the rate and direction of rotation of the upper shaft segment 108 and auger shaft assembly 104, or to completely disengage the auger shaft assembly 104. It is understood that any suitable type of a transmission means, such as a direct drive servo motor, may be utilized in place of the clutches 132, 142 in particular applications.

Figure 4:
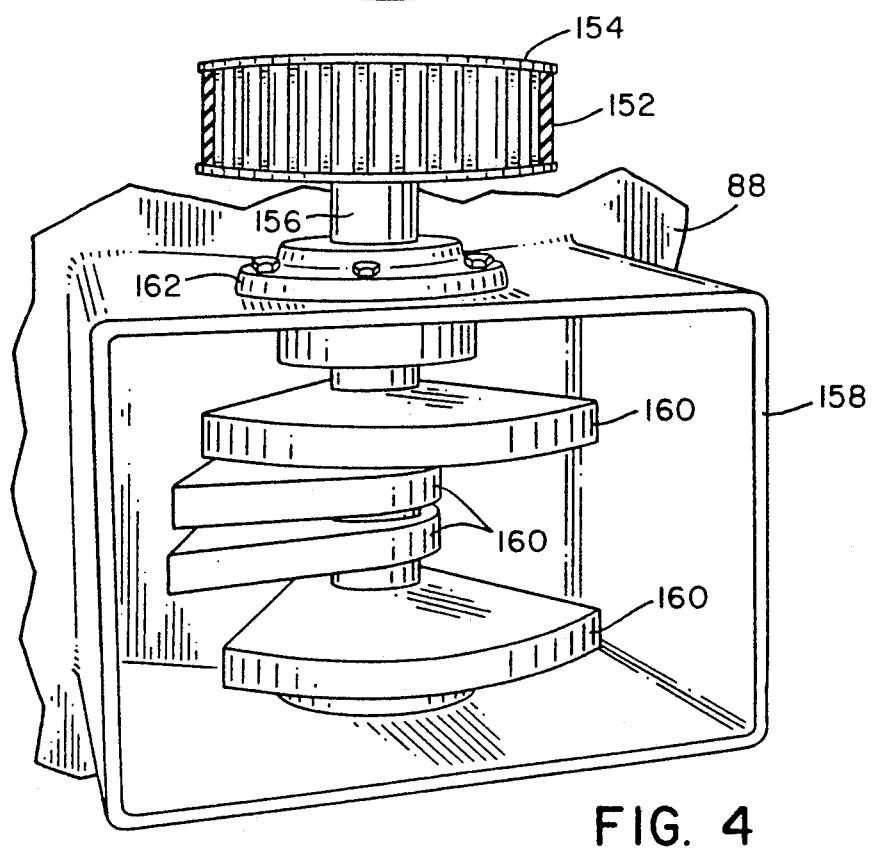
FIG. 4 is a perspective detail view of the vibrator assembly taken through line 4—4 of FIG. 1.

Referring to FIGS. 2 and 4 it may be seen that a vibrator assembly 144 or vibration producing means is connected to the auger bowl 88. The vibrator assembly 144 includes a drive motor 146 such as a DC electric motor having a drive shaft 148 and a first geared drive wheel 150 mounted thereon, with a geared drive belt 152 extending from the first drive wheel 150 to a second geared drive wheel 154 mounted on the upper end of a weight shaft 156. The weight shaft 156 extends vertically through and is mounted for rotation within a weight housing 158, the weight housing 158 being fixedly connected to the outer surface of the auger bowl 88. A plurality of counterweights 160 are mounted such that the center of mass of the combined counterweights 160 is linearly displaced or offset from the axis of rotation of the weight shaft 156, such that when the weight shaft 156 and counterweights 160 are rotated at sufficient angular velocity, the weight shaft 156 and counterweights 160 will induce oscillations or vibrations which are transmitted from the weight shaft 156 through one or more bearing assemblies 162 to the weight housing 158, and in turn to the auger bowl 88. The number and position of the counterweights 160 may be manually adjusted so that the total mass and degree of linear displacement of the center of mass of the counterweights 160 relative to the axis of rotation of the weight shaft 156 may be selectively determined, and the angular velocity of the weight shaft 156 and counterweights 160 may be monitored by the CPU 70 and the magnitude and rate of the oscillations or vibrations controlled by adjusting the speed of the drive motor 146.

Figure 11:
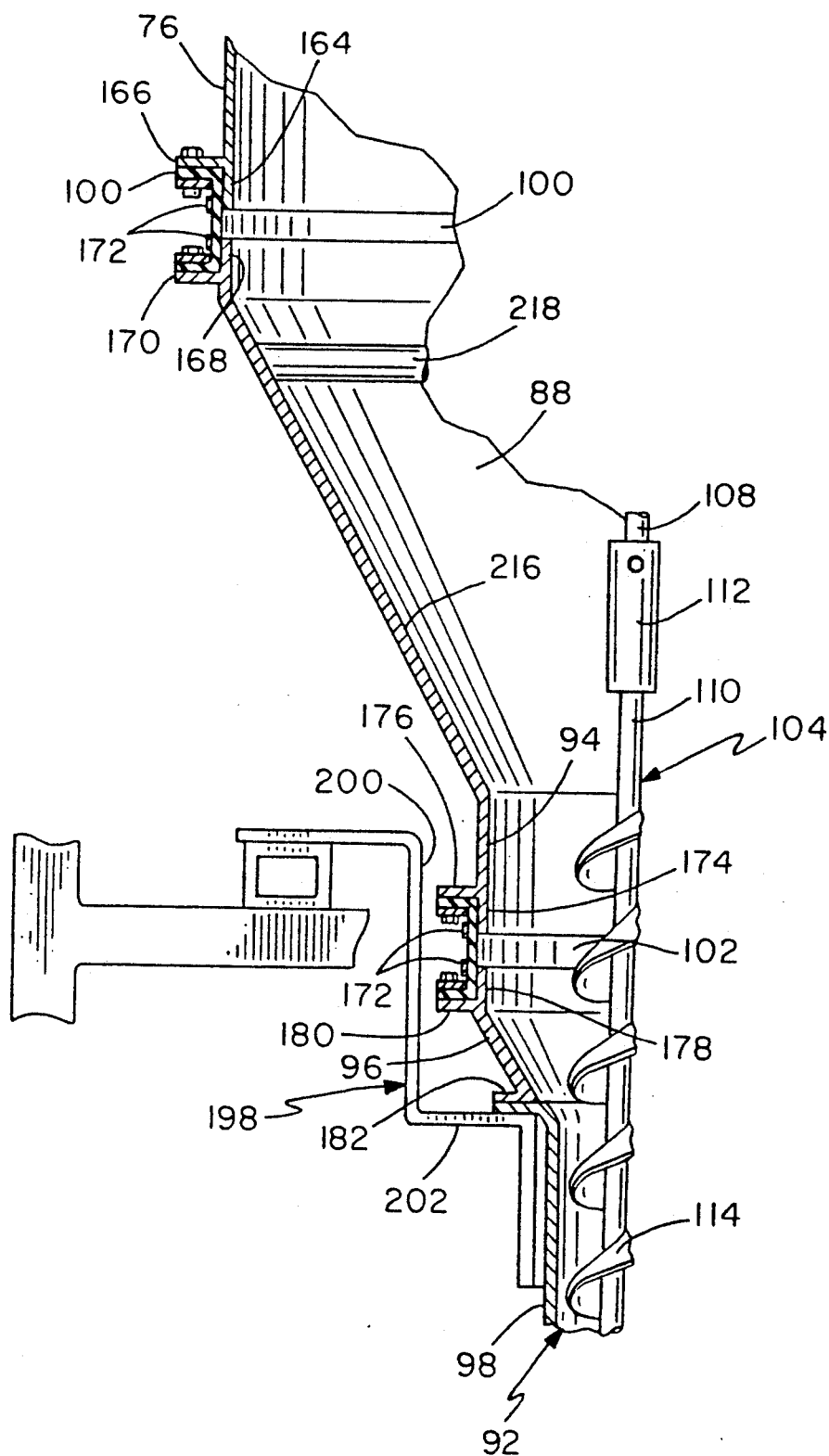
FIG. 11 is a side section view of the flexible connections between the hopper, auger bowl, and fill tube assembly.

Referring to FIGS. 2, 10, and 11, it may be seen that the flexible connectors 100, 102 disposed between the auger bowl 88 and the hopper 76 and fill tube assembly 92 insulate the hopper 76 and fill tube assembly 92 from the vibration of the auger bowl 88 so that the auger bowl 88 moves horizontally and vibrates independently of the hopper 76, fill tube assembly 92, or frame assembly 14. The upper flexible connector 100 extends around and contacts the outer surface of the bottom peripheral edge 164 of the hopper 76 beneath an outwardly extending flange member 166, and extends around and contacts the outer surface of the top peripheral edge 168 of the auger bowl 88 above an outwardly extending flange member 170. The upper flexible connector 100 is clamped or secured in place in engaging contact with the outer surface of the bottom peripheral edge 164 of the hopper 76 and the outer surface of the top peripheral edge 168 of the auger bowl 88 by a pair of metal or polymer bands 172 which are cinched or tightened sufficiently to prevent the flexible connector 100 from leaking product 54 or sliding off the bottom peripheral edge 164 of the hopper 76 and top peripheral edge 168 of the auger bowl 88 when the auger bowl 88 is vibrated vigorously over an extended period of time.

Similarly, the lower flexible connector 102 extends around and contacts the outer surface of the bottom peripheral edge 174 of the neck region 94 of the auger bowl 88 beneath an outwardly extending flange member 176, and extends around and contacts the outer surface of the top peripheral edge 178 of the upper fill tube segment 96 above an outwardly extending flange member 180. The lower flexible connector 102 is clamped or secured in place in engaging contact with the outer surface of the bottom peripheral edge 174 of the neck region 94 and the outer surface of the top peripheral edge 178 of the upper fill tube segment 96 by a pair of smaller diameter metal or polymer bands (not shown) which are cinched or tightened sufficient to prevent the flexible connector 102 from leaking product 54 or sliding off the bottom peripheral edge 174 of the neck region 94 and top peripheral edge 178 of the upper fill tube segment 96 during vibration of the auger bowl 88.

The upper fill tube segment 96 or reducer fitting has a tapered central portion, the top peripheral edge 178 having a diameter greater than the diameter of the bottom peripheral edge 182 where the upper fill tube segment 96 is joined to the lower fill tube segment 98, the bottom peripheral edge 182 having a diameter substantially equal to the diameter of the lower fill tube segment 98. The inside diameters of the bottom peripheral edge 182 and lower fill tube segment 98 are generally equal to the outer diameter of the section of flighting 114 within tolerances necessary to permit the section of flighting 114 to convey all or substantially all of the product 54 within the lower fill tube segment 98 without appreciable overflighting or spill-over around the edges of the section of flighting 114. It is understood that the respective diameters of the lower fill tube segment 98 and the section of flighting 114 may be considered approximately equal to one another even though a gap or space between the lower fill tube segment 98 and section of flighting 114 is intentionally maintained to permit a predetermined amount of overflighting to occur, whereby product 54 will pass over the edge of the section of flighting 114 between the section of flighting 114 and the inner surface of the lower fill tube segment 98.

The diameter of the top peripheral edge 178 of the upper fill tube segment 96 is generally equal to the diameter of the bottom peripheral edge 174 of the neck region 94 of the auger bowl 88 so that the respective top peripheral edge 178 and bottom peripheral edge 174 will be aligned with one another when the auger bowl 88 is at rest of not being vibrated. The diameter of the top peripheral edge 178 and bottom peripheral edge 174 are sufficient so that the auger bowl 88 may be vibrated in a generally horizontal plane perpendicular to the axis of rotation of the auger shaft assembly 104 without the neck region 94 and flexible connector 102 contacting the outer edge of the section of flighting 114. Consequently, the diameter of the bottom peripheral edge 174 of the neck region 94 should be at least equal to or greater than two times the maximum linear displacement of the auger bowl 88 relative to the centerline or axis of rotation of the lower shaft section 110 of the vertical auger shaft assembly 104 plus the maximum outer diameter of the section of flighting 114 in the proximity of the neck region 94 (or one times the total maximum linear displacement of the auger bowl 88 relative to the centerline or axis of rotation of the lower shaft section 110 if that total maximum linear displacement is considered to be the sum of the linear displacements in two diametrically opposing directions relative to the axis of rotation of the lower shaft section 110.)

Referring to FIG. 10, it may be seen that the connecting rod assemblies 90 are each comprised of a rocker arm 184 having a generally cylindrical fitting 186 fixedly attached to each opposing end of the rocker arm 184. Each of the two cylindrical fittings 186 attached to the rocker arm 184 defines a cylindrical bore (not shown), the two cylindrical bores and cylindrical fittings 186 of each rocker arm 184 being oriented generally orthogonal to one another and to a vertical centerline of the rocker arm 184 when the rocker arm 184 depends or hangs in a vertical position. Each cylindrical fitting 186 is received and disposed within an upper or lower box-like housing 188, 190 having an open bottom or top end, respectively, with the upper housing 188 being fixedly connected to a bracket 192 which is in turn fixedly connected to the outer surface of the hopper 76, and the lower housing 190 being fixedly connected to a bracket 194 which is in turn fixedly connected to the outer surface of the auger bowl 88.

A first threaded fastener 196 extends completely through the cylindrical bore of the upper cylindrical fitting 186 and through a pair of apertures defined by the opposing sides of the upper housing 188 normal to the outer surface of the hopper 76, the first threaded fastener 196 serving as an axle permitting the lower portion of the rocker arm 184 to pivot inwardly and outwardly or toward and away from the outer surface of the auger bowl 88 generally normal thereto. Conversely, a second threaded fastener 196 extends completely through the cylindrical bore of the lower cylindrical fitting 186 and through a pair of apertures defined by the inner and outer sides of the lower housing 190 parallel with the outer surface of the auger bowl 88, the second threaded fastener 196 serving as an axle permitting the upper portion of the rocker arm 184 to pivot back and forth along the outer surface of the hopper 76 generally parallel therewith. This permits the auger bowl 88 to remain suspended beneath the hopper 76 and be vibrated back and forth, with the rocker arms 184 acting as pendulums and allowing at least two degrees of freedom of motion for the auger bowl 88 (each generally orthogonal to the vertical centerline of the rocker arms 184 or within the generally horizontal plane perpendicular to the axis of rotation of the auger shaft assembly 104) plus a slight, incidental third degree of freedom of motion in the vertical direction due to the pivoting of the rocker arms 184 about a radial axis. It is understood that the orientation of the cylindrical bores of the cylindrical fittings 186 and the threaded fasteners 196 may be reversed and the same result achieved, and further that the auger bowl 88 may be mounted so as to allow substantially independent vibration in the vertical direction parallel with the vertical centerline of the rocker arms 184.

Referring to FIGS. 2 and 11, it may be seen that the fill tube assembly 92 is mounted on a suspension bracket 198 which is fixedly attached to the frame assembly 114 on opposing sides of and at approximately the same height as the upper fill tube segment 96. The suspension bracket 198 includes two inverted L-shaped segments 200 which extend inwardly and downwardly from the frame assembly 14. The lower edges of the inverted L-shaped segments 200 are connected by a central segment 202 to which the upper fill tube segment 96 and lower fill tube segment 98 are connected, the central segment 200 defining an aperture through which the lower fill tube segment 98 depends.

Figure 3:
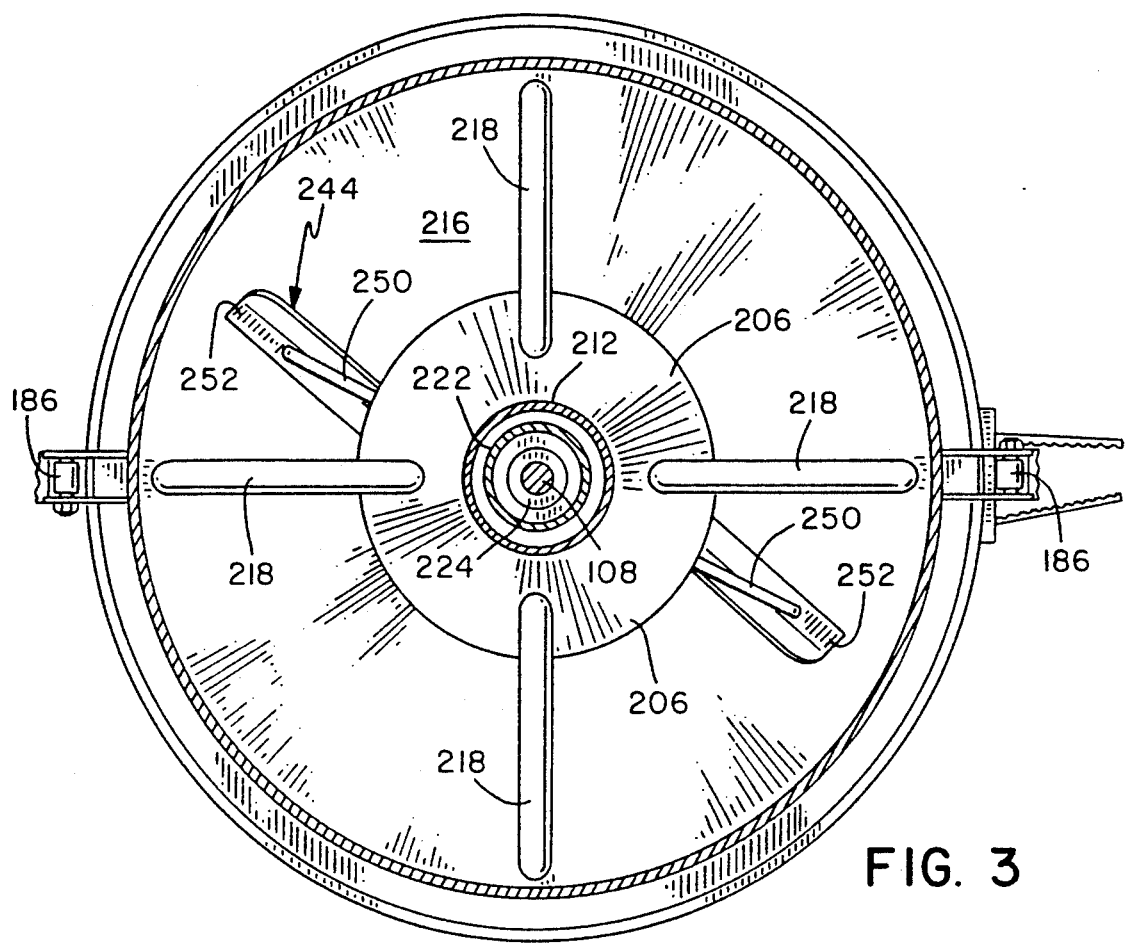
FIG. 3 is a top cross section view of the cylindrical hopper taken through line 3—3 of FIG. 2.

Referring to FIGS. 2, 3, and 5, the vertical auger bottom-fill bag filling machine 10 includes a venting assembly 204 disposed within the hopper 76. The venting assembly 204 comprises a truncated cone 206 which defines an open top aperture 208 and a peripheral bottom edge 210 and a vent tube 212, or a similar flow passage means to vent gases de-aerated from the product 54 within the auger bowl 88 to the exterior of the auger bowl 88 or to the top of the hopper 76. The vertical vent tube 212 is fixedly connected to the top of the truncated cone 206 and extends upwardly therefrom and terminates at a top end 214 or vent discharge disposed beneath the lid 78 of the hopper 76. The vent tube 212 has a diameter equal to the open top aperture 208, and is aligned and communicates therewith such that air or gas de-aerated from the product 54 within the hopper 76 at a point below the peripheral bottom edge 210 of the truncated cone 206 will pass upwardly through the vent tube 212. It should be understood that the vent tube 212 or flow passage means may be designed to extend radially outward to or through the side of the hopper 76, in which case the gases de-aerated from the product 54 will be vented outwardly rather than or as well as upwardly.

The truncated cone 206 is connected to the inner surface 216 of the auger bowl 88 by a plurality of brace members 218 which are fixedly connected to the outer top angled surface of the truncated cone 206 and the inner surface 216 of the auger bowl 88. Consequently, the venting assembly 204 is completely supported by and carried with the auger bowl 88, and vibrates linearly back and forth therewith when the vibrator assembly 144 vibrates the auger bowl 88.

Referring to FIGS. 2, 3, and 5-7, it may be seen that the vertical auger bottom-fill bag filling machine 10 also includes an agitator assembly 220 which extends from a point above the lid 78 of the hopper 76 to a position within the auger bowl 88 beneath the peripheral bottom edge 210 of the truncated cone 206. The agitator assembly 220 comprises a hollow cylindrical agitator drive shaft 222 disposed within the vent tube 212 and defining a longitudinal bore receiving the auger shaft assembly 104 such that the agitator drive shaft circumscribes the upper shaft segment 108. The agitator drive shaft 222 is carried on and rotates independently of the upper shaft segment 108 on a plurality of bearing assemblies 224 which maintain the agitator drive shaft 222 in a generally vertical orientation aligned with the upper shaft segment 108. The agitator drive shaft 222 is spaced apart from vent tube 212 on all sides a distance sufficient to permit the maximum amplitude in vibration or oscillation of the vent tube 212 and truncated cone 206 without contacting the outer surface of the agitator drive shaft 222, thereby also permitting air or gas de-aerated from the product 54 within the auger bowl 88 to be vented upwardly through the vent tube 212 between the agitator drive shaft 222 and the vent tube 212.

An agitator mounting collar 226 is removable connected to and interlocked with the bottom end of agitator drive shaft 222. The agitator mounting collar 226 consists of a pair of mating semi-annular collar segments 228,230, each collar segment 228,230 extending partially around the agitator drive shaft 222 and having a pair of generally vertical flange members 232 which abuttingly contact the flange members 234 of the opposing collar segment 230, 228 respectively. The two collar segments 228, 230 are fastened together using a plurality of threaded fasteners 236 which extend through the flange members 232, 234 or a similar fastening or securing means, with the assembled mounting collar 226 being fastened to the agitator drive shaft 222 using a plurality of threaded fasteners 238 or a similar fastening or securing means.

Extending from and fixedly connected to each of the collar segments 228, 230 on diametrically opposing sides of the mounting collar 226 is a agitator mounting bracket 240, each agitator mounting bracket 240 having a generally inverted U-shape and defining a channel 242 therein. A pair of agitator paddle assemblies 244 are removably mounted to the agitator mounting brackets 240. The agitator paddle assemblies 242 each include a generally horizontal mounting plate 246 dimensioned to be received within the channel 242 of the corresponding agitator mounting bracket 240 and connected thereto using a plurality of threaded fasteners 248 or a similar fastening or securing means, an outwardly angled paddle shaft 250 fixedly connected to and depending from the mounting plate 246, and a paddle member 252. The paddle shafts 250 are each sized and angled such that the opposing paddle shafts 250 and paddle members 252 are generally symmetrical to one another, with the paddle members 252 extending generally parallel with the inner surface of the auger bowl 88 and spaced apart therefrom sufficiently that the paddle members 252 do not contact the auger bowl 88 when the auger bowl 88 is vibrated. Each paddle member 252 is shaped and oriented to move and de-aerate the product 54 within the auger bowl 88, and to press the product 54 downwardly and inwardly within the auger bowl 88 toward the neck region 94 and section of flighting 114.

Figure 9:
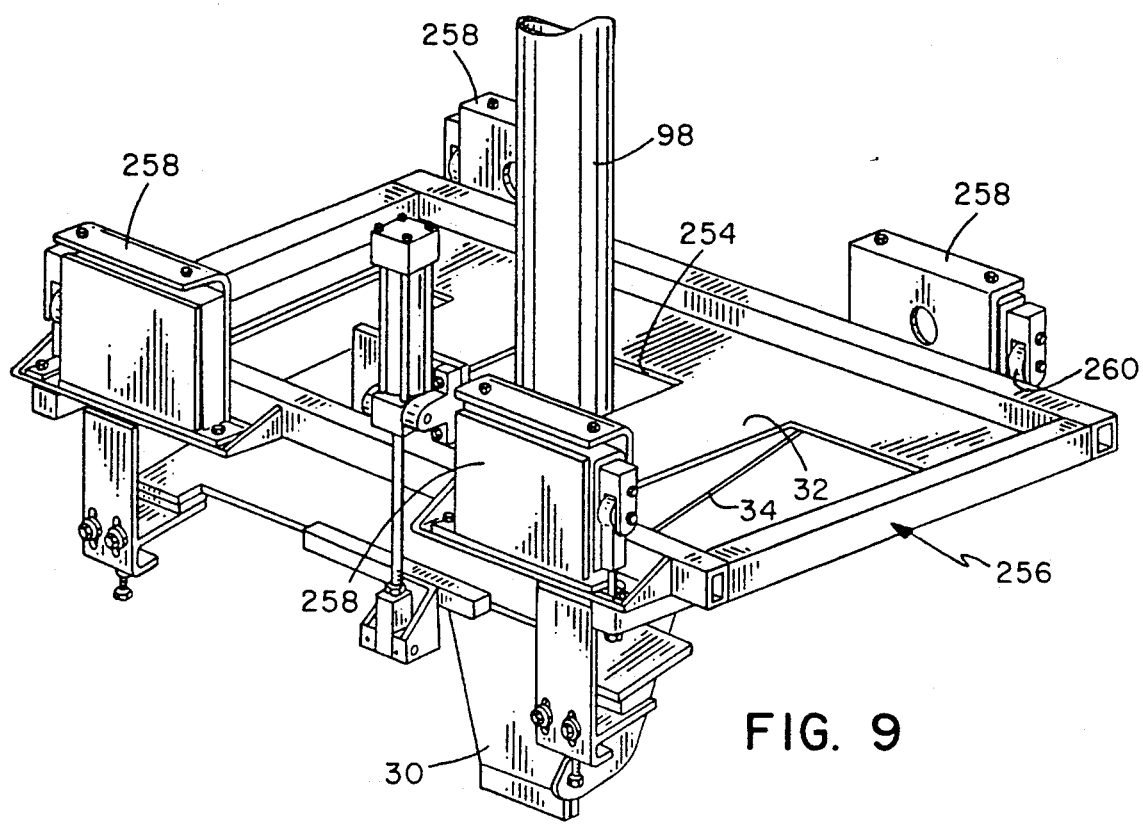
FIG. 9 is a diagrammatic perspective view of the bag weighing mechanism and pivoting spout utilized with the vertical auger bottom-fill bag filling machine of FIG. 2.

Referring to FIGS. 8 and 9, it may be seen that the horizontal carrier plates 32, 34 define a central opening 254 through which the lower fill tube segment 98 extends toward the fill spout 30 mounted thereunder. FIG. 9 shows an alternate embodiment with the carrier plates 32, 34 being disposed within a rectangular frame 256, with the rectangular frame being supported on a plurality of load cells 258. Each load cell 258 includes a contact 260 which is engaged when the lower carrier plate 34 is pivoted upwardly to parallel with the upper carrier plate 32. The rectangular frame 256 is connected to the bag elevator assembly 48 and travels therewith, the load cells 258 being capable of continuously measuring the weight of the hanging bag 22 and product 54 within the bag 22 after taring the measured weight of any suspended portion of the rectangular frame 256, carrier plates 32, 34, bag pickup and hanging mechanism 28, fill spout 30, bag holding members 40, and clamping assemblies 44.

Referring again to FIG. 2, it may be seen that a separate agitator drive motor 262 is mounted to the frame assembly 14 or lid 78 of the hopper 76, with the agitator drive motor 262 being connected to the top of the agitator drive shaft 222 via a differential 264, first drive gear 266, endless chain 268, and second drive gear 270 mounted on the agitator drive shaft 222. The agitator drive motor 262 may be a conventional variable speed DC electric motor, and may include a pickoff (not shown) or other timing or synchronization device electronically coupled to the CPU 70 such that the direction of rotation and angular velocity of the agitator paddles 252 may be monitored and adjusted either selectively or in response to the condition of the product 54 within the auger bowl 88 or fill tube assembly 92.

While the preferred embodiment of the above vertical auger bottom-fill bag filling machine 10 has been described in detail with reference to the attached drawing figures, it is understood that various changes and adaptations may be made in the vertical auger bottom-fill bag filling machine 10 without departing from the spirit and scope of the appended claims.

What is claimed is:

1. A container filling machine for filling a product into a container, said container filling machine comprising:

a hopper, said hopper having a top, a bottom peripheral edge, and an interior region to contain the product;

an auger bowl, said auger bowl being connected to and disposed generally beneath said hopper adjacent said bottom peripheral edge thereof such that the product within said hopper may be transferred downwardly into said auger bowl, said auger bowl having an interior and an outlet through which the product is transferred from said auger bowl;

a vibrator assembly, said vibrator assembly being operatively connected to said auger bowl and capable of selectively vibrating said auger bowl;

a fill tube assembly, said fill tube assembly being connected to and disposed generally beneath said auger bowl and having a portion communicating with said outlet such that the product within the auger bowl may be transferred downwardly into said fill tube assembly from said auger bowl;

an auger shaft assembly, said auger shaft assembly being oriented in a generally vertical direction and extending downwardly from a top end disposed adjacent to or above said interior region of said hopper to a lower end disposed at least partially within said fill tube assembly, said auger shaft assembly being mounted for rotational movement about an axis of rotation oriented in a generally vertical direction, said auger shaft assembly further having a section of flighting, said section of flighting being disposed at least partially within said fill tube assembly;

a venting assembly disposed at least partially within said hopper and said auger bowl, said venting assembly having a flow passage means communicating between said interior of said auger bowl and a vent discharge for removing gases de-aerated from the product within said auger bowl; and an agitator assembly disposed at least partially within said auger bowl, at least a portion of said agitator assembly being mounted for rotation within said auger bowl and capable of moving the product therein.

2. The container filling machine of claim 1 wherein the venting assembly is connected to and carried with the auger bowl such that at least a portion of the venting assembly vibrates with the auger bowl.

3. The container filling machine of claim 1 wherein the venting assembly comprises a truncated cone section, said truncated cone section having a bottom peripheral edge and an open top aperture, the flow passage means being connected to and communicating with the open top aperture of said truncated cone section and extending generally upward therefrom.

4. The container filling machine of claim 3 wherein the open top aperture has a diameter and the bottom peripheral edge of the truncated cone section has a diameter greater than said diameter of the open top aperture.

5. The container filling machine of claim 3 wherein the flow passage means includes a vent tube extending generally upward from the truncated cone, the truncated cone section and said vent tube being connected to and carried with the auger bowl such that both the truncated cone section and the vent tube vibrate with the auger bowl.

6. The container filling machine of claim 1 wherein the flow passage means generally circumscribes at least a portion of the auger shaft assembly.

7. The container filling machine of claim 6 wherein the flow passage means has a diameter and the portion of the auger shaft assembly circumscribed by the flow passage means has a diameter, said diameter of the flow passage means being sufficiently larger than said diameter of said portion of the auger shaft assembly circumscribed by the flow passage means such that the flow passage means does not contact the auger shaft assembly when the flow passage means is vibrated.

8. The container filling machine of claim 1 wherein the fill tube assembly comprises:

an upper fill tube segment; and a lower fill tube segment, said lower fill tube segment being generally aligned and communicating with said upper fill tube segment.

9. The container filling machine of claim 8 wherein the section of flighting has a diameter and is at least partially received within the lower fill tube segment, the lower fill tube segment having a diameter approximately equal to said diameter of the section of flighting received within the lower fill tube section.

10. The container filling machine of claim 8 wherein the section of flighting has a diameter and is at least partially received within the upper fill tube segment, and further wherein the vibrator assembly vibrates the auger bowl a maximum linear displacement within a generally horizontal plane perpendicular to the axis of rotation of the auger shaft assembly, the upper fill tube segment having a diameter and the outlet having a diameter, said diameter of the outlet and said diameter of the upper fill tube segment each being at least equal to or greater than said diameter of the section of flighting received within the upper fill tube segment plus two times said maximum linear displacement of the auger bowl.

11. The container filling machine of claim 8 wherein the section of flighting has a diameter and is at least partially received within the upper fill tube segment, and further wherein the vibrator assembly vibrates the auger bowl a total maximum linear displacement within a generally horizontal plane perpendicular to the axis of rotation of the auger shaft assembly, the upper fill tube segment having a diameter and the outlet having a diameter, said diameter of the outlet and said diameter of the upper fill tube segment each being at least equal to or greater than said diameter of the section of flighting received within the upper fill tube segment plus said total maximum linear displacement of the auger bowl.

12. The container filling machine of claim 1 wherein the auger bowl has a top peripheral edge and the bottom peripheral edge of the hopper is spaced apart from said top peripheral edge of the auger bowl and connected thereto by a flexible connector, said flexible connector extending substantially around and between the bottom peripheral edge of the hopper and said top peripheral edge of the auger bowl and preventing the product within the hopper or the auger bowl from escaping between the bottom peripheral edge of the hopper and said top peripheral edge of the auger bowl.

13. The container filling machine of claim 1 wherein the outlet of the auger bowl is spaced apart from the portion of the fill tube assembly aligned and communicating with the outlet, the outlet being connected to the fill tube assembly by a flexible connector, said flexible connector extending substantially around and between the outlet of the auger bowl and the portion of the fill tube assembly aligned and communicating with the outlet to prevent the product within the auger bowl or the fill tube assembly from escaping between the outlet of the auger bowl and the fill tube assembly.

14. The container filling machine of claim 1 wherein the agitator assembly includes an agitator drive shaft, said agitator drive shaft being mounted for rotation about a generally vertical axis of rotation and defining a longitudinal bore, said longitudinal bore of said agitator drive shaft receiving at least a portion of the auger shaft assembly therein.

15. The container filling machine of claim 1 wherein the agitator assembly includes an agitator drive shaft, said agitator drive shaft being mounted for rotation about a generally vertical axis of rotation, at least a portion of said agitator drive shaft being received within and spaced apart from the flow passage means.

16. The container filling machine of claim 15 wherein the flow passage means is connected to and carried with the auger bowl such that the flow passage means vibrates with the auger bowl, the flow passage means being spaced apart from the agitator drive shaft such that the agitator drive shaft does not contact the flow passage means when the flow passage means vibrates with the auger bowl.

17. The container filling machine of claim 1 wherein the agitator assembly includes an agitator drive shaft, said agitator drive shaft being mounted for rotation about a generally vertical axis of rotation and extending downwardly from a top end adjacent to or above the top of the hopper, the container filling machine further comprising:
an agitator drive assembly, said agitator drive assembly including a drive motor operatively connected to the agitator drive shaft, said drive motor being capable of rotating the agitator drive shaft at a selected angular velocity independent of the rotation of the auger shaft.

18. The container filling machine of claim 1 wherein the agitator assembly includes an agitator drive shaft, said agitator drive shaft being mounted for rotation about a generally vertical axis of rotation and extending downwardly to a lower end, the container filling machine further comprising:
an agitator mounting collar removably connected to and interlocked with the agitator drive shaft adjacent the lower end thereof.

19. The container filling machine of claim 18 wherein the agitator mounting collar includes a pair of collar segments, each of said pair of collar segments extending at least partially around the agitator drive shaft and generally mating with one another, said pair of collar segments being removably fastened together.

20. The container filling machine of claim 18 wherein the agitator assembly includes a pair of agitator paddle assemblies, each of said pair of agitator paddle assemblies being connected to and extending from the agitator mounting collar such that each of said pair of agitator paddle assemblies are generally symmetrical to one another relative to a generally vertical plane intersecting the axis of rotation of the auger shaft assembly.

21. The container filling machine of claim 18 wherein the auger bowl has an inner surface and the agitator assembly includes at least one agitator paddle assembly, said agitator paddle assembly including a paddle member extending generally parallel with said inner surface of the auger bowl and spaced apart therefrom sufficiently that said paddle member does not contact said inner surface of the auger bowl when the auger bowl is vibrated.

22. The container filling machine of claim 18 wherein the agitator assembly includes at least one agitator paddle assembly, said agitator paddle assembly including a paddle member, said paddle member being shaped and oriented to move and de-aerate the product within the auger bowl and to urge the product downwardly within the auger bowl toward the outlet thereof.

23. The container filling machine of claim 1 wherein the auger shaft assembly comprises:
an upper shaft segment; and
a lower shaft segment connected to and extending from said upper shaft segment and generally aligned therewith.

24. The container filling machine of claim 23 wherein the upper shaft segment is removably connected to the lower shaft segment by a coupler member.

25. The container filling machine of claim 1 further comprising:
an auger shaft drive assembly, said auger shaft drive assembly including an auger drive motor operatively connected to the auger shaft assembly adjacent the top end thereof, said auger drive motor being capable of rotating the auger shaft assembly at a selected angular velocity, said auger shaft drive assembly further including a transmission means operatively connected to said auger drive motor and the auger shaft assembly and capable of selectively engaging and disengaging said auger drive motor from the auger shaft assembly and adjusting said selected angular velocity of the auger shaft assembly.

26. A container filling machine for filling a product into a container, said container filling machine comprising:
a hopper, said hopper having a top, a bottom peripheral edge, and an interior region to contain the product;
an auger bowl, said auger bowl being connected to and disposed generally beneath said hopper adjacent said bottom peripheral edge thereof such that the product within said hopper may be transferred downwardly into said auger bowl, said auger bowl having an outlet through which the product is transferred from said auger bowl;
a vibrator assembly, said vibrator assembly being operatively connected to said auger bowl and capable of selectively vibrating said auger bowl;
a fill tube assembly, said fill tube assembly being connected to and disposed generally beneath said auger bowl and having a portion communicating with said outlet such that the product within the auger bowl may be transferred downwardly into said fill tube assembly from said auger bowl; and
an auger shaft assembly, said auger shaft assembly being oriented in a generally vertical direction and extending downwardly from a top end disposed adjacent to or above said interior region of said hopper to a lower end disposed at least partially within said fill tube assembly, said auger shaft assembly being mounted for rotational movement about an axis of rotation oriented in a generally vertical direction, said auger shaft assembly further having a section of flighting, said section of flighting being disposed at least partially within said fill tube assembly;
wherein the auger bowl has an interior, and wherein the container filling machine further comprises a venting assembly, said venting assembly being disposed at least partially within the hopper or the auger bowl, said venting assembly having a flow passage means communicating between the interior of the auger bowl and a vent discharge for removing gases de-aerated from the product within the auger bowl.

27. The container filling machine of claim 26 wherein the venting assembly is connected to and carried with the auger bowl such that at least a portion of the venting assembly vibrates with the auger bowl.

28. The container filling machine of claim 26 wherein the venting assembly comprises a truncated cone section, said truncated cone section having a bottom peripheral edge and an open top aperture, the flow passage means being connected to and communicating with the open top aperture of said truncated cone section and extending generally upward therefrom.

29. The container filling machine of claim 28 wherein the open top aperture has a diameter and the bottom peripheral edge of the truncated cone section has a diameter greater than said diameter of the open top aperture.

30. The container filling machine of claim 28 wherein the flow passage means includes a vent tube extending generally upward from the truncated cone section, and further wherein the truncated cone section and said vent tube are connected to and carried with the auger bowl such that both the truncated cone section and said vent tube vibrate with the auger bowl.

31. The container filling machine of claim 26 wherein the flow passage means generally circumscribes at least a portion of the auger shaft assembly.

32. The container filling machine of claim 31 wherein the flow passage means has a diameter and the portion of the auger shaft assembly circumscribed by the flow passage means has a diameter, said diameter of the flow passage means being sufficiently larger than said diameter of said portion of the auger shaft assembly circumscribed by the flow passage means such that the flow passage means does not contact the auger shaft assembly when the flow passage means is vibrated.

33. The container filling machine of claim 27 further comprising:
an agitator assembly, said agitator assembly being disposed at least partially within said auger bowl, at least a portion of said agitator assembly being mounted for rotation within said auger bowl and capable of moving the product therein, wherein said agitator assembly includes an agitator drive shaft, said agitator drive shaft being mounted for rotation about a generally vertical axis of rotation, at least a portion of said agitator drive shaft being received within and spaced apart from the flow passage means.

34. The container filling machine of claim 33 wherein the flow passage means is connected to and carried with the auger bowl such that the flow passage means vibrates with the auger bowl, the flow passage means being spaced apart from the agitator drive shaft such that the agitator drive shaft does not contact the flow passage means when the flow passage means vibrates with the auger bowl.

35. A container filling machine for filling a product into a container, said container filling machine comprising:
a hopper, said hopper having a top, a bottom peripheral edge, and an interior region to contain the product;
an auger bowl, said auger bowl being connected to and disposed generally beneath said hopper adjacent said bottom peripheral edge thereof such that the product within said hopper may be transferred downwardly into said auger bowl, said auger bowl having an outlet through which the product is transferred from said auger bowl;
a vibrator assembly, said vibrator assembly being operatively connected to said auger bowl and capable of selectively vibrating said auger bowl;
a fill tube assembly, said fill tube assembly being connected to and disposed generally beneath said auger bowl and having a portion communicating with said outlet such that the product within the auger bowl may be transferred downwardly into said fill tube assembly from said auger bowl, said fill tube assembly comprising an upper fill tube segment and a lower fill tube segment generally aligned and communicating with said upper fill tube segment; and
an auger shaft assembly, said auger shaft assembly being oriented in a generally vertical direction and extending downwardly from a top end disposed adjacent to or above said interior region of said hopper to a lower end disposed at least partially within said fill tube assembly, said auger shaft assembly being mounted for rotational movement about an axis of rotation oriented in a generally vertical direction, said auger shaft assembly further having a section of flighting, said section of flighting being disposed at least partially within said fill tube assembly and said section of flighting having a diameter and is at least partially received within the upper fill tube segment, and further wherein the vibrator assembly vibrates the auger bowl a maximum linear displacement within a generally horizontal plane perpendicular to the axis of rotation of the auger shaft assembly, the upper fill tube segment having a diameter and the outlet having a diameter, said diameter of the outlet and said diameter of the upper fill tube segment each being at least equal to or greater than said diameter of the section of flighting received within the upper fill tube segment plus two times said maximum linear displacement of the auger bowl.

36. A container filling machine for filling a product into a container, said container filling machine comprising;
a hopper, said hopper having a top, a bottom peripheral edge, and an interior region to contain the product;
an auger bowl, said auger bowl being connected to and disposed generally beneath said hopper adjacent said bottom peripheral edge thereof such that the product within said hopper may be transferred downwardly into said auger bowl, such auger bowl having an outlet through which the product is transferred from said auger bowl;
a vibrator assembly, said vibrator assembly being operatively connected to said auger bowl and capable of selectively vibrating said auger bowl;
a fill tube assembly, said fill tube assembly being connected to and disposed generally beneath said auger bowl and having a portion communicating with said outlet such that the product within the auger bowl may be transferred downwardly into said fill tube assembly from said auger bowl, said fill tube assembly comprising an upper fill tube segment and a lower fill tube segment generally aligned and communicating with said upper fill tube segment; and an auger shaft assembly, said auger shaft assembly being oriented in a generally vertical direction and extending downwardly from a top end disposed adjacent to or above said interior region of said hopper to a lower end disposed at least partially within said fill tube assembly, said auger shaft assembly being mounted for rotational movement about an axis of rotation oriented in a generally vertical direction, said auger shaft assembly further having a section of flighting, said section of flighting being disposed at least partially within said fill tube assembly and said section of flighting having a diameter and is at least partially received within the upper fill tube segment, and further wherein the vibrator assembly vibrates the auger bowl a total maximum linear displacement within a generally horizontal plane perpendicular to the axis of rotation of the auger shaft assembly, the upper fill tube segment having a diameter and the outlet having a diameter, said diameter of the outlet and said diameter of the upper fill tube segment each being at least equal to or greater than said diameter of the section of flighting received within the upper fill tube segment plus two times said maximum linear displacement of the auger bowl.

* * * * *